(12) United States Patent
Morimura

(10) Patent No.: US 10,632,611 B2
(45) Date of Patent: Apr. 28, 2020

(54) MACHINE TOOL

(71) Applicant: OKUMA Corporation, Niwa-gun, Aichi (JP)

(72) Inventor: Shoichi Morimura, Aichi (JP)

(73) Assignee: OKUMA CORPORATION, Niwa-Gun, Aichi (JP)

(*) Notice: Subject to any disclaimer, the term of this patent is extended or adjusted under 35 U.S.C. 154(b) by 0 days.

(21) Appl. No.: 16/207,631

(22) Filed: Dec. 3, 2018

(65) Prior Publication Data

US 2019/0168380 A1 Jun. 6, 2019

(30) Foreign Application Priority Data

Dec. 5, 2017 (JP) .................. 2017-233662

(51) Int. Cl.
*B23Q 11/00* (2006.01)
*B25J 9/06* (2006.01)
*B23Q 17/09* (2006.01)
*B23Q 7/04* (2006.01)
*B23Q 17/20* (2006.01)
*B23Q 11/10* (2006.01)
*B23Q 11/08* (2006.01)
(Continued)

(52) U.S. Cl.
CPC .................. *B25J 9/06* (2013.01); *B23Q 7/04* (2013.01); *B23Q 11/005* (2013.01); *B23Q 11/0891* (2013.01); *B23Q 11/10* (2013.01); *B23Q 16/10* (2013.01); *B23Q 17/006* (2013.01); *B23Q 17/0985* (2013.01); *B23Q 17/20* (2013.01); *B23Q 17/2409* (2013.01); *B25J 15/0019* (2013.01); *B23Q 2230/006* (2013.01); *B23Q 2717/003* (2013.01)

(58) Field of Classification Search
CPC .. B23Q 1/76; B23Q 7/04; B25J 9/0096; B25J 11/005; B25J 17/02
See application file for complete search history.

(56) References Cited

U.S. PATENT DOCUMENTS 2,315,393 A * 3/1943 Bowerman ............ B23Q 3/101
82/152
4,359,815 A * 11/1982 Toyoda .............. B23Q 3/15713
414/225.01
(Continued)

FOREIGN PATENT DOCUMENTS

JP 05301141 A 11/1993
JP 05301142 A 11/1993
(Continued)

*Primary Examiner* — Nicole N Ramos
(74) *Attorney, Agent, or Firm* — Cantor Colburn LLP

(57) ABSTRACT

The machine tool includes a tool post linearly movable along a direction parallel to an X axis and a direction parallel to a Z axis, a workpiece spindle which retains a workpiece in a condition rotatable about an axis parallel to the Z axis, and an in-machine robot which is installed in a machining chamber and has joints. The joints of the in-machine robot include a base joint rotatable about an axis parallel to the Z axis, and three parallel joints rotatable about an axis orthogonal to the axis of rotation of the base joint, the parallel joints being located on a distal end side of the base joint and successively arranged from the base joint. The axis of rotation of the base joint is displaced from that of the workpiece spindle.

9 Claims, 8 Drawing Sheets

(51) Int. Cl.
*B23Q 17/00* (2006.01)
*B23Q 17/24* (2006.01)
*B23Q 16/10* (2006.01)
*B25J 15/00* (2006.01)

(56) References Cited

U.S. PATENT DOCUMENTS

| | | | | |
|---|---|---|---|---|
| 5,634,377 | A * | 6/1997 | Kimura | B25J 9/042 |
| | | | | 74/490.04 |
| 6,374,158 | B1 * | 4/2002 | Fusaro, Jr. | B23K 10/027 |
| | | | | 700/254 |
| 9,308,644 | B2 * | 4/2016 | Hsieh | B25J 9/044 |
| 10,307,877 | B2 * | 6/2019 | Morimura | B23K 26/0093 |
| 2002/0189063 | A1 * | 12/2002 | Prust | B23Q 1/623 |
| | | | | 29/27 R |
| 2009/0075795 | A1 * | 3/2009 | Okabe | B23Q 3/1572 |
| | | | | 483/18 |
| 2010/0028117 | A1 | 2/2010 | Nihei et al. | |
| 2010/0061830 | A1 | 3/2010 | Kitayama et al. | |
| 2012/0073413 | A1 * | 3/2012 | Len | B23B 5/00 |
| | | | | 82/104 |
| 2014/0174774 | A1 * | 6/2014 | Okamoto | B23Q 17/007 |
| | | | | 173/20 |
| 2015/0033898 | A1 * | 2/2015 | Hsieh | B25J 17/02 |
| | | | | 74/490.06 |
| 2017/0326700 | A1 | 11/2017 | Morimura | |
| 2017/0326701 | A1 | 11/2017 | Morimura | |
| 2017/0329316 | A1 * | 11/2017 | Morimura | B23B 3/065 |
| 2017/0348772 | A1 * | 12/2017 | Morimura | B25J 19/02 |
| 2018/0056503 | A1 * | 3/2018 | Morimura | B23Q 7/04 |
| 2018/0250809 | A1 * | 9/2018 | Morimura | B25J 9/0009 |

FOREIGN PATENT DOCUMENTS

| | | |
|---|---|---|
| JP | 2010036285 A | 2/2010 |
| JP | 2010064158 A | 3/2010 |
| JP | 2014240111 A | 12/2014 |
| JP | 2017202547 A | 11/2017 |
| JP | 2017202548 A | 11/2017 |

* cited by examiner

MACHINE TOOL

CROSS REFERENCE TO RELATED APPLICATION

The present application claims priority under 35 U.S.C. § 119 to Japanese Patent Application No. 2017-233662 filed on Dec. 5, 2017, the entire content of which is incorporated herein by reference.

TECHNICAL FIELD

The present disclosure discloses a machine tool equipped with a tool post capable of linearly moving along a direction parallel to a first axis and along a direction parallel to a second axis, and a workpiece spindle device which retains a workpiece in a condition rotatable about an axis parallel to the second axis.

BACKGROUND

In recent years, demands for automating machine tools and improving performance of the machine tools have been increasing more and more. To achieve the automation, automatic changer devices have been suggested, including an automatic tool changer (ATC) for automatically changing tools and an automatic pallet changer (APC) for automatically changing pallets on which a workpiece is placed. Further, peripheral devices including work feeding devices, such as a loader and a bar feeder, have been well known. Meanwhile, to achieve the improvement in performance, in-machine measurement using sensors and intellectualization have been implemented.

Further, in a part of the field related to machine tools, use of a robot has been suggested for automating the machine tools and further improving performance of the machine tools. For example, JP 2010-036285 A (hereinafter referred to as Patent Document 1) discloses a technique for loading and unloading a workpiece to a machine tool by means of a robot installed outside the machine tool. Further, J P 2010-064158 A (hereinafter referred to as Patent Document 2) discloses a technique in which an articulated robot is installed so as to travel on a gantry rail attached to an upper part of a machine tool, and transfer of workpieces through multiple machine tools is performed by the articulated robot. Still further, JP 2014-240111 A (hereinafter referred to as Patent Document 3) discloses a configuration in which a robot having a plurality of joints rotatable around a vertical axis is installed on a top surface of a machining device.

CITATION LIST

Patent Literature

Patent Document 1: JP 2010-036285 A
Patent Document 2: JP 2010-064158 A
Patent Document 3: JP 2014-240111 A However, the robot described in Patent Document 1 is a so-called vertical articulated robot, and its control requires a complicated coordinate conversion process. The robots described in Patent Documents 2 and 3 have a plurality of joints that rotate around axes parallel to each other. For this reason, it can be said that coordinate calculation for the robots is relatively easy. However, as another aspect of the easy coordinate calculation, motions of the robots are simple, which imposes limitations on implementable types of robot work. In particular, when a robot is used for assisting an operation of machining a workpiece on a lathe or the like, it is desirable that the distal end of the robot be movable following movement of a tool. However, it is difficult for simply structured robots, such as the robots described in Patent Documents 2 and 3, to follow movement of the tool, while vertical articulated robots, such as the vertical articulated robot described in Patent Document 1, require complicated control operation to follow movement of the tool.

Given these circumstances, the present disclosure discloses a machine tool equipped with a robot which is easily controllable and also capable of performing various tasks and in particular, a task to be achieved following movement of a tool while avoiding interference with other components.

SUMMARY

In one aspect, a machine tool disclosed in the present disclosure includes a tool post that is configured to retain one or more tools and is linearly moved along a direction parallel to a first axis and along a direction parallel to a second axis which is orthogonal to the first axis, a workpiece spindle device that is configured to retain a workpiece in a condition rotatable about an axis parallel to the second axis, and an in-machine robot that is installed in a machining chamber and has a plurality of joints and a plurality of links through which the plurality of joints are connected. The plurality of joints in the in-machine robot include at least a base joint rotatable around an axis parallel to the second axis, and three parallel joints rotatable about axes which are orthogonal to the axis of rotation of the base joint, in which the three parallel joints are located closer to a distal end of the in-machine robot than the base joint and are successively arranged from the base joint toward the distal end. In the machine tool, the axis of rotation of the base joint is displaced from the axis of rotation of the workpiece spindle device.

When structured as described above, the links connected by the three parallel joints are rotated about the axes which are parallel to each other. As a result, coordinates of the links can be obtained through a simple calculation, thereby contributing to easy control of the links. In particular, when the axes of rotation of the parallel joints are arranged along directions substantially orthogonal to a travel plane of the tool post, it becomes possible to move the distal end of the links in a plane parallel to a travel plane of the tool, which can easily cause the distal end of the links to follow movement of the tool. On the other hand, the axes of rotation of the three parallel joints can be changed in orientation by rotating the base joint, which allows a hand of the robot to be oriented along various directions. In addition, because the axis of rotation of the base joint is displaced from the axis of rotation of the workpiece spindle device, the links are prevented from interfering with the workpiece spindle device and the workpiece when an extreme end of the links is moved in the plane parallel to the travel plane of the tool.

In the above-described structure, joints, among the plurality of joints, located closer to an extremity portion of the in-machine robot than the base joint may be all rotary joints which rotate about axes parallel to each other.

When structured as described above, it becomes easier to calculate coordinates of the hand of the in-machine robot.

In another aspect, the in-machine robot may be changed, by rotation of the base joint, to a tool-following position in which the axes of rotation of the three parallel joints are parallel to a third axis which is orthogonal to both the first axis and the second axis, and the plurality of links other than an extremity link may be attached at height positions where the plurality of links other than the extremity link do not interfere with the tool post and the tools retained by the tool post when the robot takes the tool-following position.

When structured as described above, it can be further ensured that interference between the in-machine robot and the tool or other components is prevented.

In a further aspect, it is preferable that the axis of rotation of the base joint is located above the workpiece spindle device. In another aspect, the machine tool may further include an aperture which allows an inner space of the machining chamber to be in communication with the outside of the machining chamber, and a door for opening and closing the aperture, in which the base joint may be located closer to the door than the workpiece spindle in a horizontal direction.

In the above-described structure, when the door is closed, the in-machine robot may select, from among a plurality of inverse kinematic solutions to the distal end position of the in-machine robot, a solution in which the middle one of the three parallel joints is located most inward within the machining chamber.

When structured as described above, interference between the in-machine robot and the door can be prevented with an increased degree of reliability.

In another aspect, the base joint may be maintained stationary so as not to rotate during a period from start to finish of a series of actions performed by the in-machine robot.

When configured as described above, the travel plane of the links connected through the three parallel joints remains unchanged during the period from start to finish of the series of actions, which can contribute to further simplification of position control of the in-machine robot.

In another aspect, the in-machine robot may be attached to a stationary region inside the machining chamber, or may be attached to a movable body which moves within the machining chamber.

According to the machine tool disclosed in this disclosure, various types of work can be achieved using the in-machine robot with simple control operation while preventing interference between the in-machine robot and other components.

BRIEF DESCRIPTION OF DRAWINGS

Embodiments of the present disclosure will be described by reference to the following figures, wherein.

DESCRIPTION OF EMBODIMENTS

Figure 1:
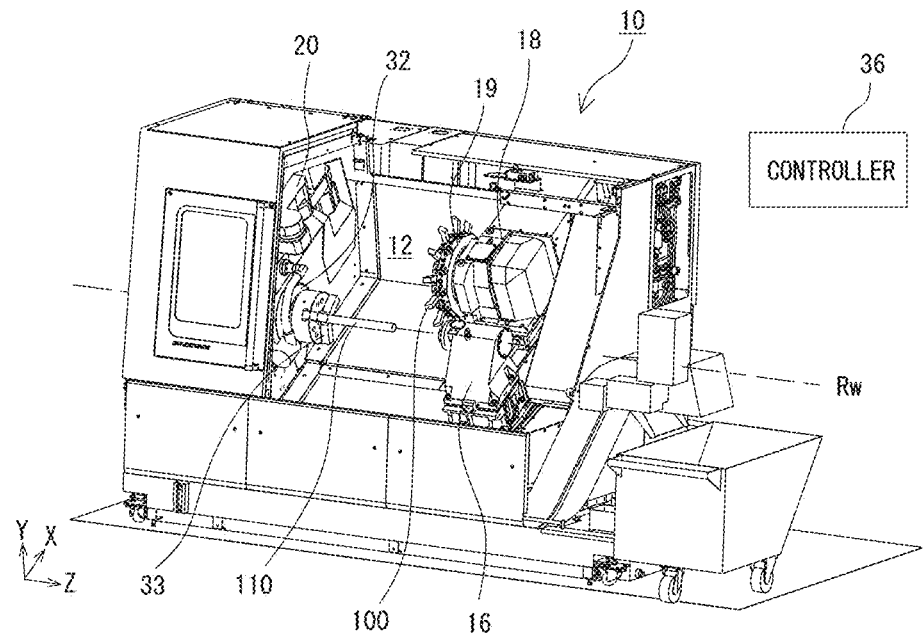
FIG. 1 shows components of a machine tool.

Hereinafter, components of a machine tool 10 will be described with reference to the drawings. FIG. 1 shows the components of the machine tool 10. In the following description, a direction parallel to a rotation axis Rw of a workpiece spindle 32 is referred to as a Z axis, a direction parallel to a travel direction of a tool post 18 orthogonal to the Z axis is referred to as an X axis, and a direction orthogonal to both the X axis and the Z axis is referred to as a Y axis. Further, on the Z axis, a direction approaching from the workpiece spindle 32 toward a tail stock 16 is defined as a positive direction; on the X axis, a direction approaching from the workpiece spindle 32 to the tool post 18 is defined as the positive direction; and on the Y axis, a direction approaching from the workpiece spindle 32 to the above is defined as the positive direction. Moreover, in the following explanation, the expression that an end effector 40 "makes access to" an object means that the end effector 40 attached to an in-machine robot 20 is moved to a position where the end effector 40 is located close enough to the object to carry out its assigned task. As used herein, when the end effector 40 is a temperature sensor which detects the temperature of an object in a condition of contacting the object, the expression "make access to" means that the end effector 40 is moved to a position where the end effector 40 physically contacts the object. Meanwhile, when the end effector 40 is a temperature sensor which detects the temperature of an object without contacting the object, the expression "make access to" means that the end effector 40 is moved to a position in the proximity of the object where the end effector 40 is able to detect the temperature of the object.

The machine tool 10 is a lathe for machining a workpiece 110, in which the rotating workpiece 110 is machined by bringing a tool 100 retained by the tool post 18 into contact with the workpiece 110. More specifically, the machine tool 10 is an NC-controlled turning center equipped with a turret 19 which retains two or more tools 100. A machining chamber 12 of the machine tool 10 is, on its outside, surrounded by a cover. As shown in FIG. 1, a front surface of the machining chamber 12 has a large aperture which is opened and closed by a door (not illustrated in FIG. 1). An operator can approach each component within the machining chamber 12 through the aperture. During a machining process, the door provided to the aperture is closed. This is performed to secure safety, environment, and the like.

Figure 2:
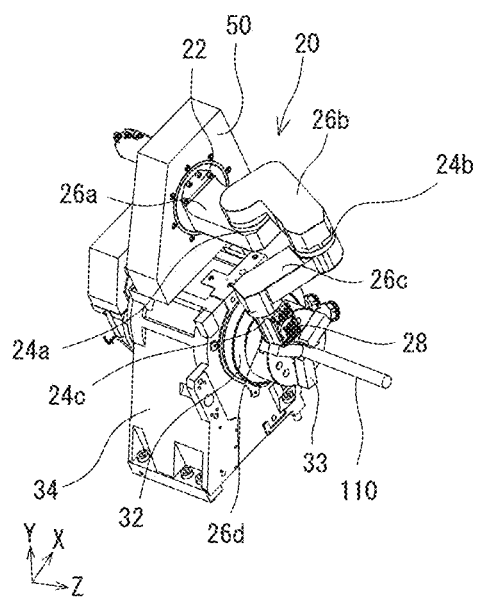
FIG. 2 is a perspective view showing components around an in-machine robot.

The machine tool 10 includes a workpiece spindle device which rotatably retains one end of the workpiece 110, the tool post 18 which retains the tools 100, and the tail stock 16 which supports the other end of the workpiece 110. The workpiece spindle device includes a spindle base 34 (which is hidden behind other components and non-viewable in FIG. 1, and is shown in FIG. 2) incorporating a drive motor and other components, and also includes the workpiece spindle 32 attached to the spindle base 34. The workpiece spindle 32 includes a chuck 33 and a collet for removably retaining the workpiece 110, and the workpiece 110 retained on the workpiece spindle 32 can be changed to another one as needed. In addition, the workpiece spindle 32 and the chuck 33 are able to rotate about a workpiece rotation axis Rw extending along a horizontal direction (the Z axis direction in FIG. 1).

The tail stock 16 is placed so as to be opposed to the workpiece spindle 32 along the Z axis direction and configured to support the other end of the workpiece 110 which is supported at the one end by the workpiece spindle 32. The tail stock 16 is installed at a location where the center axis of the tail stock 16 is aligned with the rotation axis Rw of the workpiece 110. A center having a conically sharpened tip end is attached to the tail stock 16, and during a machining operation, the tip end of the center is contacted with the center point of the workpiece 110. The tail stock 16 is configured to be movable along the Z axis direction, so that it can be contacted to and separated from the workpiece 110.

The tool post 18 holds the tool 100, such as, a tool called a bite. The tool post 18 is movable along the Z axis; i.e., a direction parallel to the axis of the workpiece 110. Further, the tool post 18 is placed on a guide rail extending along a direction parallel to the X axis; i.e., extending along a radial direction of the workpiece 110, which allows the tool post 18 to advance and retreat along the direction parallel to the X axis. It should be noted that as is evident from FIG. 1, the X axis is inclined relative to the horizontal direction in such a manner that the X axis is displaced higher as it approaches a deeper region of the machining chamber 12 when viewed from the aperture thereof. The distal end of the tool post 18 is equipped with the turret 19 which can retain the two or more tools 100. The turret 19 is rotatable about an axis parallel to the Z axis. Then, when the turret 19 is rotated, it becomes possible to change as appropriate one of the tools 100 selected for use in machining the workpiece 110 to another one of the tools 100. When the tool post 18 is moved along the direction parallel to the Z axis, the tools 100 retained on the turret 19 are accordingly moved along the direction parallel to the Z axis. On the other hand, when the tool post 18 is moved along the direction parallel to the X axis, the tools 100 retained on the turret 19 are accordingly moved along the direction parallel to the X axis. Then, the movement of the tool post 18 along the direction parallel to the X axis can cause a change in a depth of cut into the workpiece 110 or other features of the cut performed by one of the tools 100. That is, the tools 100 attached to the tool post 18 can be moved in a plane parallel to an XZ plane. Hereinafter, the place in which the tools 100 are movable is referred to as a "tool moving plane."

The machining chamber 12 further houses the in-machine robot 20. The in-machine robot 20 may be, as described below, installed at any location under a condition that an axis of rotation of a base joint 22 becomes parallel to the Z axis, and the location is not limited to a specific location so long as the condition is satisfied. In the example illustrated in FIG. 1, a root of the in-machine robot 20 is attached to, among the wall surfaces of the machining chamber 12, a wall surface on which the workpiece spindle 32 is protrudingly disposed. In addition, the root of the in-machine robot 20 is, as described below, located above the workpiece spindle 32 and closer to the door than the workpiece spindle 32. The in-machine robot 20 is used for assisting a machining operation, sensing various values, and performing auxiliary and other operations. The structure and function of the in-machine robot 20 will be described in detail below.

A controller 36 controls actuation of each component in the machine tool 10 in accordance with instructions from the operator. The controller 36 is composed of, for example, a CPU for performing various computations, and a memory for storing various control programs and control parameters. Further, the controller 36 has a communication function, and can exchange various types of data, such as NC program data, with other devices. The controller 36 may further include, for example, a numerical control device which continuously computes positions of the tool 100 and the workpiece 110. In addition, the controller 36 may be implemented by a single device or may be composed of a combination of computing devices.

Figure 3:
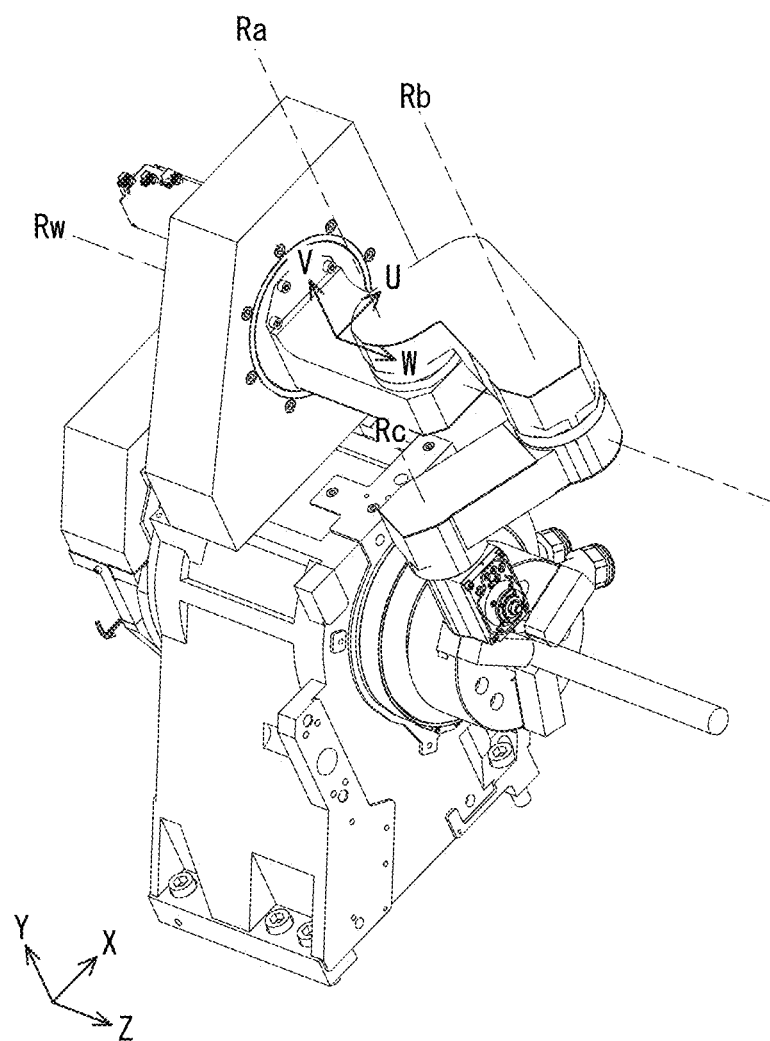
FIG. 3 is a diagram for explaining axes related to the in-machine robot.

Next, with reference to FIG. 2 and FIG. 3, the in-machine robot 20 installed in the machining chamber 12 will be described. FIG. 2 is a perspective view showing the in-machine robot 20 and components around the in-machine robot 20, and FIG. 3 is a diagram for explaining axes related to the in-machine robot 20. As shown in FIG. 2, the in-machine robot 20 is an articulated robot which has first to fourth links 26a to 26d (which are hereinafter referred to as "links 26" using a reference numeral without an alphabetical subscript unless the first to fourth links are distinguished from each other in explanation, and the same is applied to other parts), and four joints 22 and 24a to 24c through which the four links 26 are connected. An actuator, such as a motor, is attached to each of the joints 22 and 24a to 24c, and actuation of the actuator is controlled by the controller 36. The controller 36 computes, based on a driving amount of the actuator attached to each of the joints 22 and 24a to 24c, the position of a distal end of the in-machine robot 20 and thus the position of the end effector 40 attached to the distal end of the in-machine robot 20.

The four joints 22 and 24a to 24c incorporated in the in-machine robot 20 are broadly categorized into two types: the base joint 22 located closest to the root of the in-machine robot 20, and three parallel joints 24 which are successively and adjacently arranged in a region closer to the distal end of the in-machine robot 20 than the base joint 22. The base joint 22 is a rotary joint for allowing the first link 26a to rotate about the axis parallel to the Z axis. The base joint 22 is attached, within the machining chamber 12, to a wall surface 50 to which the workpiece spindle 32 is also attached. However, a rotation axis Rz of the base joint 22 is shifted upward and frontward from the rotation axis Rw of the workpiece spindle 32. The three parallel joints 24 are rotary joints configured to rotate about axes which are parallel to each other. Rotation axes Ra to Rc of the parallel joints 24 are extended along directions which are orthogonal to the rotation axis Rz of the base joint 22. The links 26 are rotatively moved about the rotation axes Ra to Rc of the parallel joints 24, respectively. It should be noted that the wall surface 50 to which the in-machine robot 20 is attached may have a recessed region 56 (see FIG. 4) in which a part of the in-machine robot 20 may be housed.

Here, when a portion of the in-machine robot 20 including the three parallel joints 24 and the four links 26 attached to the parallel joints 24 is defined as a "parallel multi joint arm," the parallel multi joint arm has a structure similar to that of a SCARA robot. In this case, a calculation of the distal end of the parallel multi-joint arm (the distal end of the fourth link 26d; i.e., the distal end of the in-machine robot 20) becomes easy. For example, as shown in FIG. 3, taking a base end of the parallel multi-joint arm (a base end of the first link 26a) as an origin point, a coordinate system is established with a V axis parallel to the rotation axes Ra to Rc of the parallel joints 24, and U and W axes which are orthogonal to the V axis. In the coordinate system, the V-axis coordinate of the distal end of the parallel multi joint arm has a constant value. Because of this, in coordinate calculation for the distal end of the parallel multi-joint arm, the coordinates can be determined by calculating only values of the U-axis coordinate and the W-axis coordinate of the distal end, which means that the three dimensional coordinates of the distal end of the arm in the UVW coordinate system can be obtained through two dimensional calculation. Here, the UVW coordinate system is rotated as the base joint 22 is rotated. However, because the rotation is uniaxial rotation about a single axis (the axis parallel to the Z axis), it is relatively easy to convert the UVW coordinate system into a coordinate system of the entire machine tool (an XYZ coordinate system). In other words, when the in-machine robot 20 has the structure in which the base joint 22 rotating about the axis parallel to the Z axis and the three parallel joints 24 rotating about the axes which are orthogonal to the rotation axis Rz of the base joint 22 and also parallel to each other are successively arranged as in the case of this example, coordinate calculation can be simplified, and thus position control of the in-machine robot 20 can be simplified accordingly. As a result, calculation resources used for controlling actuation of the robot can be reduced in the controller 36.

Meanwhile, in this example, the rotation axis Rz of the base joint 22 is arranged so as to be parallel to the Z axis. Therefore, when the rotations axes Ra to Rc of the parallel joints 24 are brought into parallelism with the Y axis by rotating the base joint 22, the distal end of the in-machine robot 20 will be moved in an XZ plane, and thus a plane parallel to the tool moving plane. Here, the position of the tool 100 and a position of a cutting point are changed as a process of machining the workpiece 110 progresses. When the plane on which the distal end of the in-machine robot 20 is moved is brought into parallelism with the tool moving plane as in the case of this example, the end effector 40 attached to the distal end of the in-machine robot 20 can be easily operated so as to follow movement of the tool 100 or the cutting point. As a result, the end effector 40 can always perform, at suitable positions, its machining, monitoring, and other operations applied to the tool 100 and the cutting point. Specific processes of the operations, such as machining and monitoring, will be described in detail below.

Figure 4:
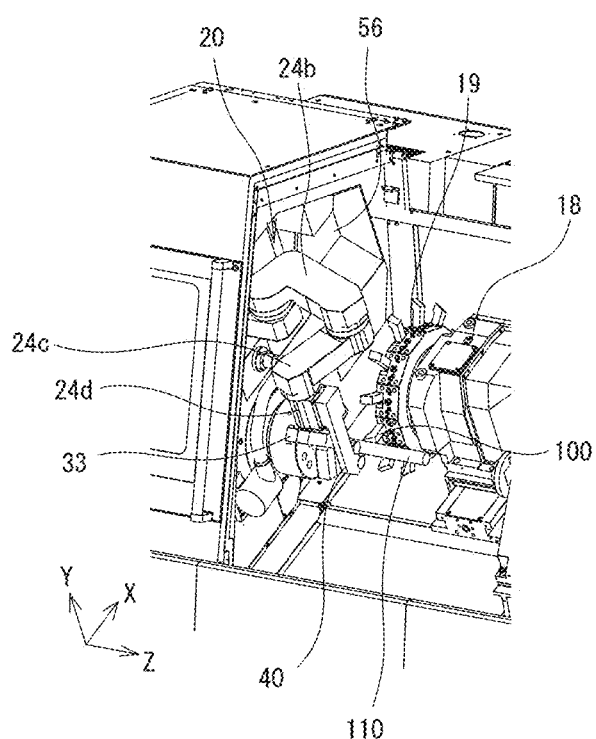
FIG. 4 is a perspective view showing a state where vibrations of a workpiece are reduced by means of the in-machine robot.

The in-machine robot 20 is equipped with the end effector 40 (see FIG. 4). The end effector 40 is a component which accesses a target object to apply a certain action onto the target object. The end effector 40 may be attached, on the in-machine robot 20, to any location which is shifted as the joints are actuated. However, in terms of the capability of the end effector 40 to access the target object without interference with other components, it is preferable that the end effector 40 be attached to the distal end of the in-machine robot 20 (the distal end of the fourth joint 26*d*). Further, although the end effector 40 may be undetachably attached to the in-machine robot 20, it is desirable for the end effector 40 to be detachably attached to the in-machine robot 20, for the purpose of enhancing versatility of the in-machine robot 20. In this connection, it is preferable that a tool changer 28 for detachably holding the end effector 40 be arranged on a portion of the in-machine robot 20 (the distal end of the fourth link 26*d* in the example shown in FIG. 4). Further, the number of end effectors 40 attached to the in-machine robot 20 is not limited to one, and two or more end effectors 40 may be attached. For example, both the distal end of the fourth link 26*d* and a side surface of the third link 26*c* may be equipped with their own tool changers 28.

The end effector 40 may be any component that performs a certain action as described above, and there is no specific limitation to the end effector 40. Accordingly, the end effector 40 may be, for example, a holder device for holding a target object. A form of holding the target object in the holder device may be a form of a hand including a pair of members for holding the target object, a form of sucking to hold the target object, or a form using magnetic force or other forces to hold the target object.

In another embodiment, the end effector 40 may be a sensor that senses, for example, information about the target object and an environment around the target object. The sensor may be, for example, a contact sensor that detects the presence or absence of physical contact with the target object, a distance sensor that detects a distance to the target object, a vibration sensor that detects vibrations of the target object, a pressure sensor that detects the pressure applied from the target object, a sensor that detects a temperature of the target object, or other types of sensors. The detected results from the sensors are stored in connection with information on the position of the end effector 40 calculated from the driving amount of the joints, and then analyzed. For example, when the end effector 40 is the contact sensor, the controller 36 analyzes the position, shape, and movement of the target object based on a time at which physical contact with the target object is detected and information on the position at the time.

In still another embodiment, the end effector 40 may be, for example, a pushing mechanism for pushing a target object. More specifically, the end effector 40 may be, for example, a roller or the like that is pushed against the workpiece 110 to reduce vibrations of the workpiece 110. In a further embodiment, the end effector 40 may be a device that outputs a fluid to assist machining. Specifically, the end effector 40 may be a device that injects air for blowing away swarf or a cooling fluid (such as a cutting oil or cutting water) for cooling the tool 100 or the workpiece 110. Moreover, the end effector 40 may be a device that ejects energy or material for workpiece shaping. In this case, the end effector 40 may be a device which emits a laser or an arc, or may be a device which ejects material for lamination shaping. In another embodiment, the end effector 40 may be a camera for capturing an image of the target object. In this embodiment, the image obtained by the camera may be displayed on an operation panel or other displays.

Next, an example of various operations performed using the end effector 40 and the in-machine robot 20 will be described. In the in-machine robot 20 of this example, as described above, the parallel multi joint arm having the three parallel joints 24 can be rotated about the axis parallel to the Z axis by means of the base joint 22. Because the parallel multi-joint arm has the structure similar to that of the SCARA robot, position control for each of the links 26 can be simplified in a state where the base joint 22 is maintained stationary. In this respect, when a certain operation is performed by means of the end effector 40, it is desirable that the base joint 22 be immobilized and maintained in the stationary state until the certain operation is finished.

For example, when a process of cutting the workpiece 110 with the tool 100 is assisted or monitored by the end effector 40, it is desirable that the end effector 40 be moved following movement of the tool 100. To achieve this, the base joint 22 is initially rotated to thereby set the in-machine robot 20 in a state where the rotation axes Ra to Rc of the parallel joints 24 are parallel to the Y axis. In the following description, the state where the rotation axes Ra to Rc of the parallel joints 24 are parallel to the Y axis is referred to as a "tool-following position" While the in-machine robot 20 is set in the tool-following position, the links 26 and the end effector 40 attached to one of the links 26 are moved only in a plane parallel to the tool moving plane. As a result, the end effector 40 can precisely and easily perform the operation to assist or monitor the cutting process.

Figure 6:
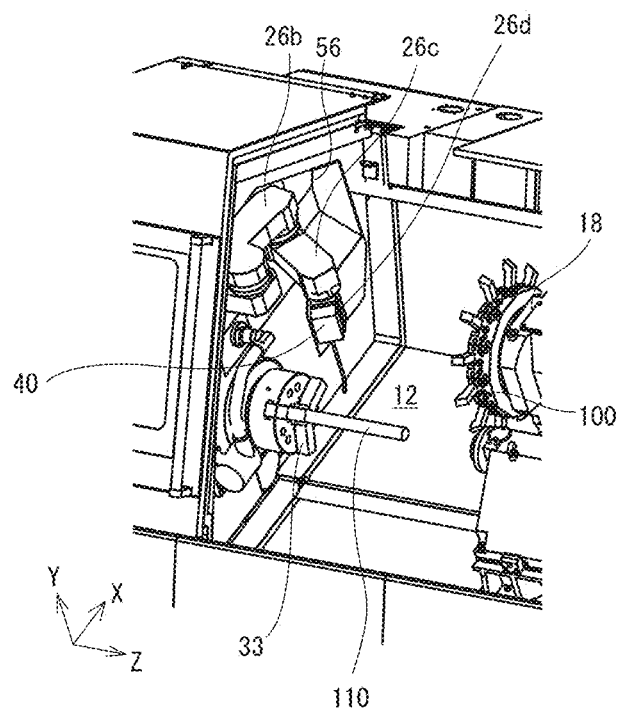
FIG. 6 is a perspective view showing a state where the workpiece is supplied with a cooling fluid by means of the in-machine robot.

As the operation performed by the end effector 40 to assist or monitor the cutting process, various operations can be considered. For example, the end effector 40 may be equipped with a nozzle for injecting a fluid, such as air or a cooling fluid, and may be used for supplying the fluid to the cutting point, the tool 100, the workpiece 110, or other components. FIG. 6 is a perspective view showing a state in which the cooling fluid is supplied to the workpiece 100. In another embodiment, the end effector 40 may be equipped with a temperature sensor, and may be used for monitoring temperatures at the cutting point or the temperature of the tool 100. In a further embodiment, the end effector 40 may be equipped with the vibration sensor, and may be brought into contact with the workpiece 110 at a point opposite to the cutting point to obtain information about vibrations of the workpiece 110. In a still further embodiment, the end effector 40 may be equipped with the pushing mechanism, and may be used for pushing the workpiece 110 at the point opposite to the cutting point to reduce the vibrations of the workpiece 110.

Figure 5:
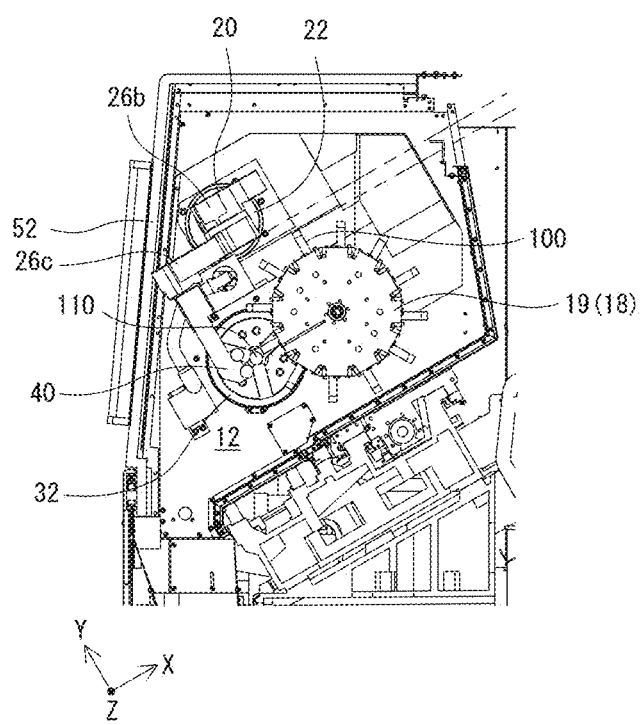
FIG. 5 is a diagram showing the state of FIG. 4 as viewed along a Z axis direction.

FIG. 4 is a perspective view showing a state in which the vibrations of the workpiece 110 are reduced by means of the end effector 40 equipped with the pushing mechanism, and FIG. 5 is a diagram showing the state of FIG. 4 viewed along the Z axis direction. In the example shown in FIG. 4 and FIG. 5, the end effector 40 equipped with the pushing mechanism (more specifically, a support roller) is attached to the fourth link 26d. The end effector 40 in this example pushes the point opposite to the cutting point on a circumferential surface of the workpiece 110 toward the cutting point to reduce the vibrations of the workpiece 110.

In the above-described state, the rotation axes Ra to Rc of the three parallel joints 24 are parallel to the Y axis. Further, in the state, lengths of the links 26 are defined in such a manner that the links 26 can move without interfering with the wall surfaces of the machining chamber 12 or the door 52. In other words, the links 26 constituting a part of the in-machine robot 20 are designed in size so as to allow the in-machine robot 20 to assist or monitor the cutting process while the door 52 of the machining chamber 12 is maintained closed. In this connection, while the door 52 is closed, it is desirable to select, from a plurality of inverse kinematic solutions to the position of the distal end of the in-machine robot 20, a solution in which the middle one of the three parallel joints 24a to 24c (i.e. the second parallel joint 24b) is located at the innermost position within the machining chamber 12.

In addition, the attachment position of the base joint 22 is set, as shown in FIG. 5, at a height position where the second link 26b and the third link 26c; i.e. the links 26d and 26c whose both ends incorporate the parallel joints 24, do not interfere, in the tool-following position, with the tool post 18 and the tool 100 mounted on the tool post 18. In other words, when the in-machine robot 20 takes the tool-following position, the links 26 constituting a part of the in-machine robot 20 other than the distal end link 26d; i.e., the links 26a to 26c, are all located above both the tool post 18 and the tool 100 attached to the tool post 18 in the Y axis direction.

Meanwhile, in another embodiment, various operations may be performed by the end effector 40 in a state in which the base joint 22 is rotated to thereby bring the rotation axes Ra to Rc of the parallel joints 24 in parallelism with the vertical direction. When the rotation axes Ra to Rc of the parallel joints 24 are brought into parallelism with the vertical direction, the links 26 and the end effector 40 attached to one of the links 26 are moved in the horizontal plane. Hereinafter, the state in which the rotation axes Ra to Rc of the parallel joints 24 are parallel to the vertical direction is referred to as a "horizontal moving position." Because, in the horizontal moving position, the rotation axes of the parallel joints 24 become parallel to the direction of gravitation, the horizontal moving position is suitable for conveying a heavy load, such as, for example, the workpiece 110.

Figure 7:
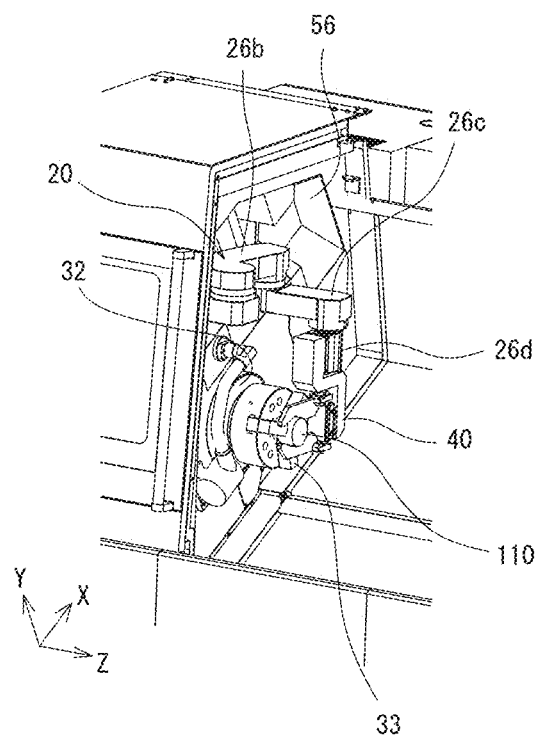
FIG. 7 is a diagram showing a state where a workpiece attaching position is reversed by means of the in-machine robot.
Figure 8:
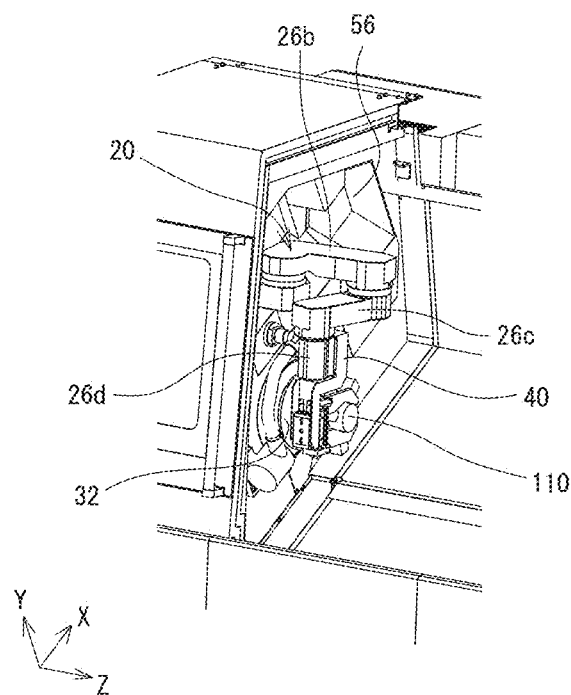
FIG. 8 is a diagram showing the state where the workpiece attaching position is reversed by means of the in-machine robot.

FIG. 7 and FIG. 8 are perspective views showing a state in which the attaching orientation of the workpiece 110 is reversed using the in-machine robot 20 with the end effector 40. Further, in FIG. 9, the state of FIG. 8 is viewed along the Z direction.

Figure 9:
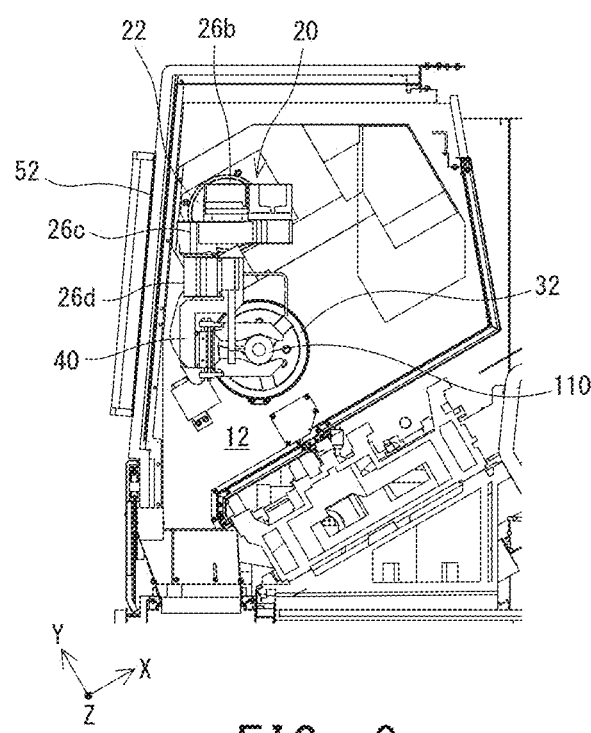
FIG. 9 is a diagram showing the state of FIG. 7 as viewed along the Z axis direction.

Typically, the workpiece spindle 32 grasps the root of the workpiece 110. Therefore, in this state, it is not possible to machine the root of the workpiece 110. For enabling the machining of the root of the workpiece 110, it is necessary that after the completion of machining of a tip end portion and a middle portion of the workpiece 110, the workpiece 110 be detached from the workpiece spindle 32, and the attaching orientation of the workpiece 110 should be subsequently reversed for allowing the workpiece spindle 32 to grasp the workpiece 110 at its tip end. Thus, in the example shown in FIG. 7 and FIG. 8, the end effector 40 incorporating a hand mechanism is used for performing an operation to reverse the workpiece 110 as described above. When the operation to reverse the workpiece 110 is performed, it is desirable that the base joint 22 be rotated to bring the rotation axes Ra to Rc of the parallel joints 24 into parallelism with the vertical direction. It is also desirable that the in-machine robot 20 be formed in a size that, as shown in FIG. 9, allows the in-machine robot 20 to be prevented from interfering with the door 52 of the machining chamber 12 during the operation to reverse the workpiece 110. With this size setting, the workpiece 110 can be reversed without opening the door 52 of the machining chamber 12. As a result, for example, the time required for opening and closing the door 52 can be eliminated, and mist having been supplied to the machining chamber 12 can be prevented from leaking to the outside.

Figure 10:
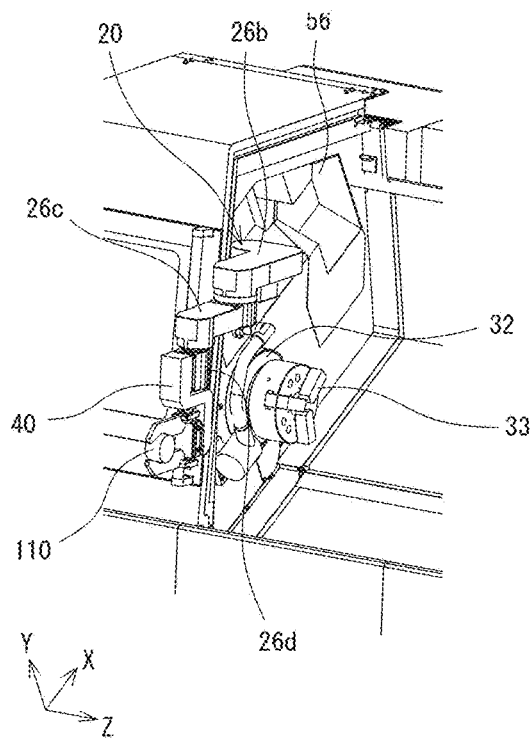
FIG. 10 is a diagram showing a state where the workpiece is loaded or unloaded from or to the outside of the machining chamber by means of the in-machine robot.
Figure 11:
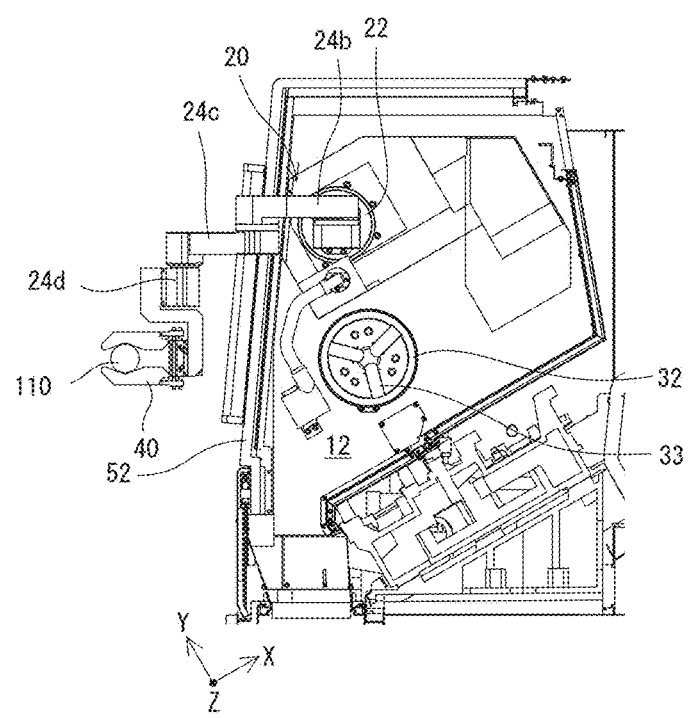
FIG. 11 is a diagram showing the state of FIG. 10 as viewed along the Z axis direction.

Further, in another embodiment, the in-machine robot 20 and the end effector 40 may be used for changing the workpiece 110 or other components to another one in a region outside the machining chamber 12. FIG. 10 shows a state in which the workpiece 110 is loaded or unloaded using the in-machine robot 20 and the end effector 40 in the horizontal moving position outside the machining chamber 12. FIG. 11 shows the state viewed along the Z direction.

As shown in FIG. 10 and FIG. 11, the workpiece 110 or other components can be loaded or unloaded using the end effector 40 incorporating the hand mechanism by shifting the movable second to fourth links 26b to 26d toward the outside of the machining chamber 12. Here, for allowing the end effector 40 to access a location outside the machining chamber 12, it is desirable that the base joint 22 of the in-machine robot 20 be positioned, as shown in FIG. 11, closer to the door 52 than the workpiece spindle 32 in the horizontal direction.

It should be noted that although the example of loading and unloading the workpiece 110 at the location outside the machining chamber 12 has been explained, the object to be conveyed or exchanged is not limited to the workpiece 110, and may be any object. For example, the tools 100, the end effectors 40, and other components may be provided at a certain location outside the machining chamber 12, and the in-machine robot 20 may be operated as needed to reach the location outside the machining chamber 12 for replacing or changing the end effectors 40 or the tools 100. In addition, the in-machine robot 20 and the end effector 40 may be used to transport a machined workpiece 110 to a workpiece stocker installed outside the machining chamber 12.

In addition, the in-machine robot 20 may, of course, take positions other than the tool-following position in which the rotation axes Ra to Rc of the parallel joints 24 become parallel to the Y axis or the horizontal moving position in which the rotation axes Ra to Rc of the parallel joints 24 become parallel to the vertical direction. For example, the base joint 22 may be rotated so as to bring the rotation axes Ra to Rc of the parallel joints 24 in parallelism with the horizontal direction. In such a rotated state, the links 26 are able to move in a vertical plane; i.e., are vertically movable. Then, in the state, operations to clean up the machining chamber 12, transfer and receive the workpiece 110 to and from a conveyer or other devices installed in a region above the machine tool 10, etc. can be performed using the in-machine robot 20 and the end effector 40.

The above-described structures are disclosed by way of illustration, and may be modified or changed as appropriate so long as the three parallel joints 24 are successively arranged from the single base joint 22. For example, in the above-described examples of the in-machine robot 20, the four joints 22 and 24a to 24c are provided to implement the structure having four degrees of freedom, while one or more joints may be arranged on a proximal end side of the base joint 22 and/or on a distal end side of the third parallel joint 24c to implement a structure having five or more degrees of freedom.

Figure 12:
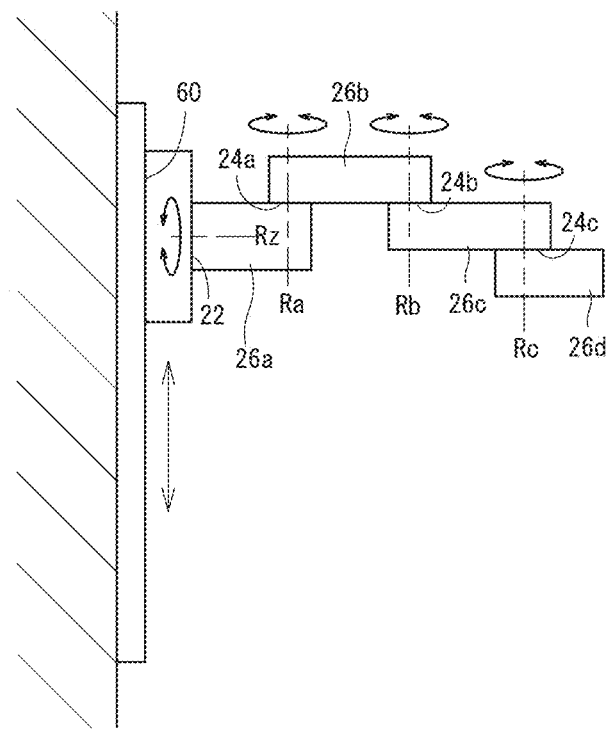
FIG. 12 is a diagram showing another example of the in-machine robot.

However, in view of simplification of coordinate computation, it is desirable that any joint provided in a region on a proximal end side of the base joint 22 be a linear motion joint which causes no change in the orientation of the base joint 22. FIG. 12 is a diagram showing an example where a linear motion joint 60 for movement along the vertical direction is disposed on the proximal end side of the base joint 22.

Figure 13:
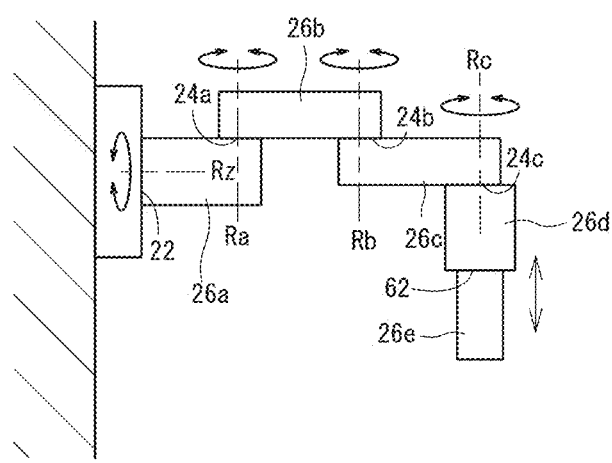
FIG. 13 is a diagram showing a further example of the in-machine robot.

Similarly, in view of simplification of coordinate computation, it is desirable that all joints disposed in a region on the distal end side of the base joint 22 be rotary joints rotatable about axes parallel to each other. However, a rotary joint rotating about an axis non-parallel to the rotation axes Ra to Rc of the parallel joints 24 or a linear joint linearly movable along various axes may be arranged in a region closer to the distal end of the in-machine robot 20 than the three parallel joints 24. In this case, as shown in FIG. 13, for example, a distal end portion of the fourth link 26d may be connected to a fifth link 26e via a linear motion joint 62 which is linearly moved along an axis parallel to the rotation axes Ra to Rc of the parallel joints 24.

Figure 14:
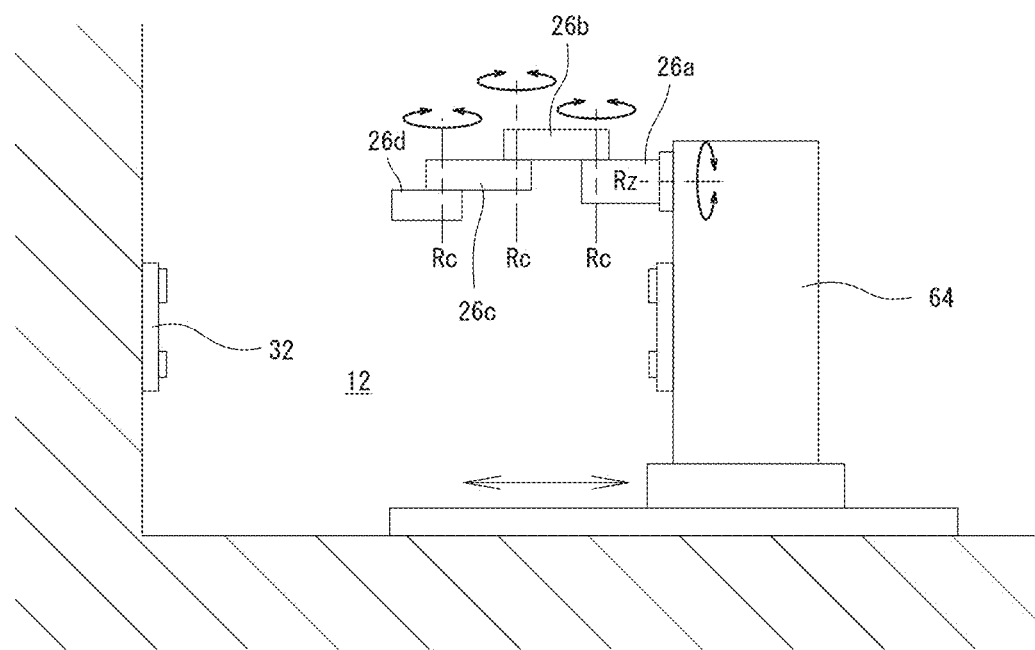
FIG. 14 is a diagram showing a still further example of the in-machine robot.

In addition, although it has been explained that the in-machine robot 20 is attached to one of the wall surfaces of the machining chamber 12; i.e., a stationary object, the in-machine robot 20 may be attached to a movable object. For example, in some cases, the machine tool 10 may include an auxiliary spindle device which is arranged so as to be opposed to the workpiece spindle 32 in the Z axis direction and configured to be movable along the Z axis direction. In a case where, as shown in FIG. 14, the machine tool 10 includes such an auxiliary spindle device 64, the in-machine robot 20 may be attached to a part of the auxiliary spindle device 64. In this structure, the movable range of the in-machine robot 20 can be extended, to thereby improve versatility of the in-machine robot 20.

REFERENCE SIGNS LIST 10 machine tool, 12 machining chamber, 16 tail stock, 18 tool post, 19 turret, 20 in-machine robot, 22 base joint, 24 parallel joint, 26 link, 28 tool changer, 32 workpiece spindle, 33 chuck, 34 spindle base, 36 controller, 40 end effector, 50 wall surface, 52 door, 56 recessed region, 60 linear joint, 62 linear joint, 64 auxiliary spindle device, 100 tool, 110 workpiece.

The invention claimed is:

1. A machine tool, comprising:
a tool post which is configured to retain one or more tools and is linearly moved along a direction parallel to a first axis and along a direction parallel to a second axis orthogonal to the first axis;
a workpiece spindle device which is configured to retain a workpiece in a condition rotatable about an axis parallel to the second axis; and
an in-machine robot installed in a machining chamber, the robot comprising a plurality of joints and a plurality of links for connecting the joints,
wherein the plurality of joints in the in-machine robot comprise at least;
a base joint which rotates about an axis parallel to the second axis, and
three parallel joints which respectively rotate about axes orthogonal to the axis of rotation of the base joint, the three parallel joints being located closer to a distal end of the in-machine robot than the base joint and successively arranged from the base joint toward the distal end, and
wherein the axis of rotation of the base joint is displaced from the axis of rotation of the workpiece spindle device.

2. The machine tool according to claim 1, wherein among the plurality of joints, those located closer to an extremity portion of the in-machine robot than the base joint are all rotary joints which rotate about axes parallel to each other.

3. The machine tool according to claim 1, wherein:
the in-machine robot is changeable to a tool-following position in which the axes of rotation of the three parallel joints are parallel to a third axis orthogonal to both the first axis and the second axis by rotating the base joint, and
the plurality of links other than an extremity link are attached at height positions where the plurality of links other than the extremity link do not interfere with the tool post and the one or more tools retained by the tool post when the robot takes the tool-following position.

4. The machine tool according to claim 1, wherein the axis of rotation of the base joint is located above the workpiece spindle device.

5. The machine tool according to claim 1, further comprising:
an aperture for allowing an inner space of the machining chamber to be in communication with the outside thereof; and
a door for opening and closing the aperture,
wherein the base joint is located in a horizontal direction closer to the door than the workpiece spindle device.

6. The machine tool according to claim 5, wherein when the door is closed, the in-machine robot selects, from among a plurality of inverse kinematic solutions to the distal end position of the in-machine robot, a solution in which the middle one of the three parallel joints is located most inward in the machining chamber.

7. The machine tool according to claim 1, wherein the base joint is maintained stationary so as not to rotate during a period from start to finish of a series of actions of the in-machine robot.

8. The machine tool according to claim 1, wherein the in-machine robot is attached to a stationary region inside the machining chamber.

9. The machine too according to claim 1, wherein the in-machine robot is attached to a movable component which moves within the machining chamber.

* * * * *